United States Patent [19]
Bender et al.

[11] 3,922,819
[45] Dec. 2, 1975

[54] DEVICE FOR MACHINING MANTLE SURFACES
[75] Inventors: Albert Bender, Nellingen; Hans Grimm, Berkheim, both of Germany
[73] Assignee: Maschinenfabrik Gehring KG, Nellingen, Germany
[22] Filed: Nov. 8, 1974
[21] Appl. No.: 522,105

Related U.S. Application Data
[63] Continuation of Ser. No. 355,862, April 30, 1973, abandoned.

[30] Foreign Application Priority Data
Apr. 29, 1972 Germany............................ 2221207

[52] U.S. Cl............ 51/101 R; 51/DIG. 32; 51/34 A
[51] Int. Cl.²....................... B24B 7/04; B24B 17/00
[58] Field of Search......... 51/100, 101 R, 34 A, 349

[56] References Cited
UNITED STATES PATENTS
3,774,346 11/1973 Hoglund................................ 51/349
FOREIGN PATENTS OR APPLICATIONS
1,045,841 12/1958 Germany............................ 51/34 A Primary Examiner—Othell M. Simpson
Attorney, Agent, or Firm—Walter Becker

[57] ABSTRACT

A device for machining of mantle surfaces which differ from a cross-sectionwise uninterrupted cylinder shape, for instance trochoidal mantle surfaces, especially for machining the inner epitrochoidal surfaces of cylinder piston machines, or the like, by means of a tool on the rotatable tool body of which there is mounted at least one machining element which is movable transverse to the axis of rotation of the tool body, for instance a grinding stone, adapted by means of a pressure fluid operable piston to be pressed against the machining surface while the cylinder receiving the piston is for purposes of connection with a pressure fluid source connected to a pressure fluid conduit. The pressure fluid conduit has arranged therein a pressure controlled device which is operatively connected to a control element that is influenced in conformity with the rotary angular position of the tool.

7 Claims, 3 Drawing Figures

DEVICE FOR MACHINING MANTLE SURFACES

This is a continuation of application Ser. No. 355,862, filed Apr. 30, 1973, now abandoned.

The present invention relates to a device for machining by chip-removing mantle surfaces which cross-section-wise differ from an uninterrupted circular shape, for instance trochoidal mantle surfaces, especially for machining the inner epitrochoidal surfaces of circular piston machines or the like. More specifically, the present invention relates to a device of the above mentioned type with a tool having a rotatable tool body on which there is mounted at least one machining element which is movable transverse to the axis of rotation of the rotatable tool body. Such tool may for instance be a grinding stone which by means of a pressure fluid operable piston is adapted to be pressed against the machining surface while the cylinder pertaining to said piston is connected to a pressure fluid conduit leading to a source of pressure fluid.

With the heretofore known device of this type, the grinding stones are arranged on radially pivotable supports while the cylinder is connected to a common hydraulic pressure fluid system which communicates continuously with a source of pressure fluid. With this heretofore known device, the requirement as to high quality of the machined surface and as to high machining precision cannot be met satisfactorily. Experience has shown that when employing a device of the above mentioned type which operates with the same constant pressure on all machining elements, no uniform removal of the material over the circumference of the trochoid can be realized. In particular, at the transition areas from wide to narrower areas as well as at places with interruptions for instance those areas of the combustion chamber of circular piston machines which are provided with outlet and inlet openings, the removal of material differs.

A fundamental reason for the above mentioned fact is seen in that the removal of material is a function of the cutting speed and of the specific pressure at which the grinding stone is pressed against the machining surface. In view of the kinematics of the device, however, an instant cutting speed is not possible and the specific pressing-on pressure changes continuously because in view of the different radii and angle of action at which the tool acts upon the work piece, as well as the interruptions in the machining surface, periodically repeated differently large grinding stone surfaces perform a grinding action.

It is, therefore, an object of the present invention so to design a device of the above mentioned general type that the removal of material can be influenced in each region of the machining surface substantially independently of the removal of material in the adjacent region so that for instance a uniform removal of material will be assured. These and other objects and advantages of the invention will appear more clearly from the following specification in connection with the accompanying drawings, in which:

FIG. 1 diagrammatically illustrates an axial section through a device according to the present invention.

Figure 1:
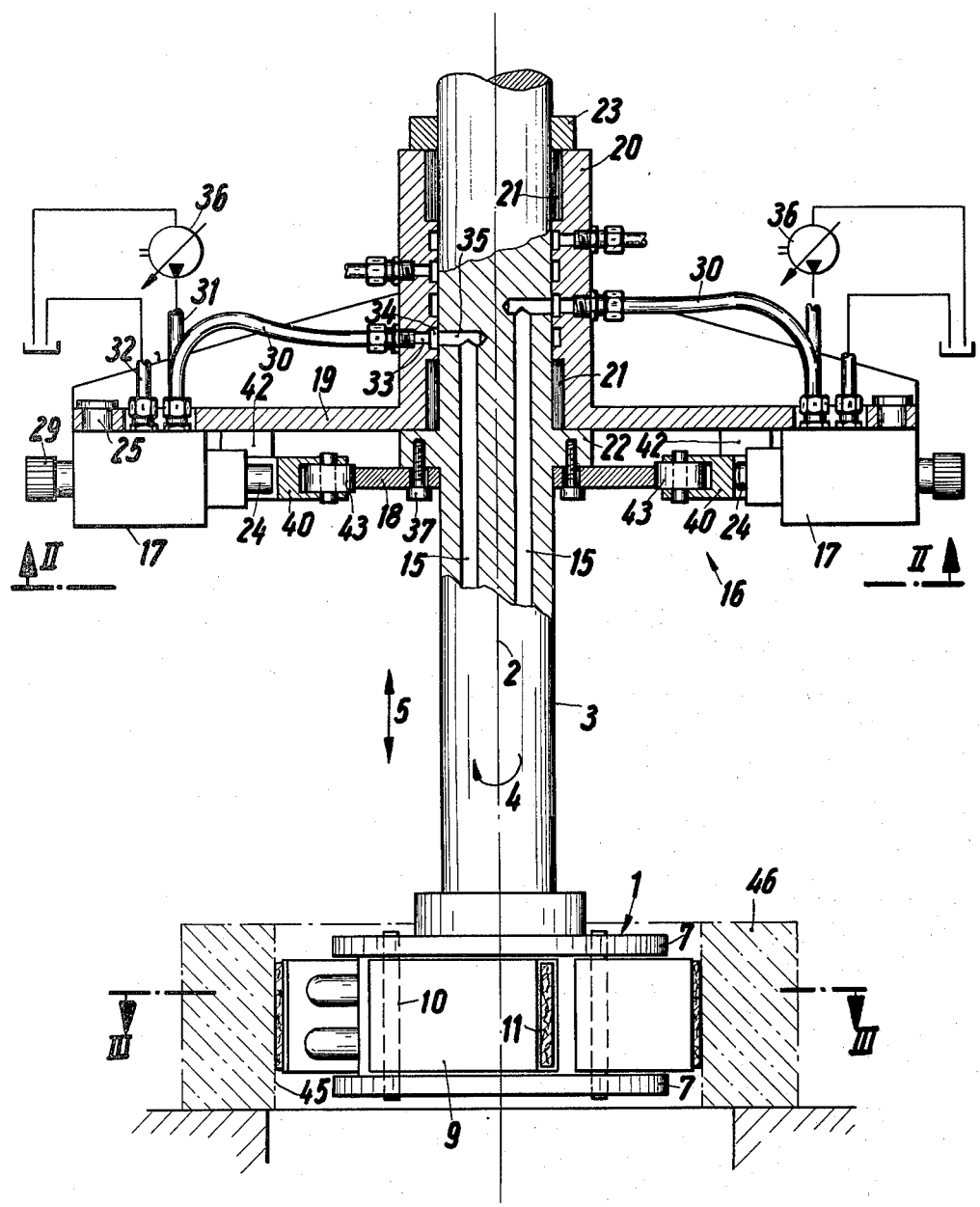

A device according to the present invention for machining mantle surfaces which deviate cross-sectionwise from an uninterrupted circular shape by means of a tool which is adapted by a pressure fluid operable piston to be pressed against the machining surface, while the cylinder pertaining to said piston is connected through a pressure fluid conduit with a source of pressure fluid, is characterized primarily in that in the pressure fluid conduit there is arranged a pressure control device which operatively connected with a control member adapted to be influenced in conformity with the rotary angular position of the tool.

With a device of this type, it will be possible with trochoidal machining surfaces to realize a uniform removal of material over the entire mantle surface and to assure that the geometrical form of the trochoid will not change any longer. It is also possible for purposes of obtaining a desired new shape of the machining surface in different areas of the machining surface to remove the material to a different extent. The device according to the invention is also suitable for machining mantle surfaces which have an exclusively circular uninterrupted cross section. The device according to the invention is particularly well suitable for machining mantle surfaces which deviate in cross section from the uninterrupted circular form and which while having a cross sectional circular shape are provided with interruptions, perforations, recesses or the like.

For purposes of obtaining a high cutting output and a safe support of the tool at the machining surface, a plurality of machining elements distributed around the tool axis are provided which are preferably connected with separate pistons so that each machining element for instance with regard to its pressing-on pressure is adapted to be controlled independently of the other machining elements. If desired, also machining elements may be provided which are arranged one behind the other in the direction of the axis of the tool. It is particularly expedient when the machining elements are uniformly distributed about the tool axis.

The fact that the machining elements are adapted to be controlled individually may be realized for instance by connecting the cylinders associated with the various machining elements to separate pressure fluid conduit means so that they can be subjected to different pressures. It is also possible to connect two or more and, if desired, all pressure fluid conduits to a common pressure control device so that the pertaining machining elements are pressed against the machining surface at approximately the same pressure. It is particularly expedient when in at least one pressure fluid conduit there is provided a separate pressure control device while preferably in all pressure fluid conduits separate control devices are arranged so that in a simple manner an independent pressing of the machining element against the surface to be machined will be possible.

For purposes of obtaining a simple construction of the device and for assuring a very high machining precision, at least two, preferably all, pressure control devices are operatively connected to a common control element.

In order to prevent the control systems from influencing each other, at least one of the control devices has associated therewith a separate pressure fluid source while preferably all pressure control devices have associated therewith separate sources of pressure fluid.

The control device can be formed in a simple manner by a pressure control valve the actuating element of which is operatively connected to the control element, said actuating element preferably being formed by a displaceable valve push rod.

For further simplifying the construction of the device, the control element is formed by a control cam, especially a cam disc, which is operatively connected to the tool and which is preferably arranged along the tool axis and is non-rotatably connected to the tool so that its movement will be effected synchronously with the tool with the result that a very precise control will be assured.

If the control element is exchangeably connected to a collar of a driving rod or the like which carries the tool, it is possible by exchanging the control element to adapt the course of the control to the respective requirements in a very simple manner.

A particularly advantageous further development of the device according to the present invention consists in that between the pressure fluid source and the pertaining machining element there is provided an adjustable transmission device for changing the pressing-on pressure of the machining element. Preferably, the actuating element of the pressure device is operatively connected to the control element through the intervention of an adjustable transmission drive. As a result thereof, the transmission ratio between the control element and the magnitude of the corresponding changes in the pressing-on pressure of the machining elements can be adjusted within a certain range so that the device can be better adapted to the respective problems and a change or a new manufacture of the control element will not be neccessary. According to a very simple embodiment of the invention, the transmission drive includes a pivotally mounted lever which by means of a running element for instance a roller engages the control cam with an engaging surface which extends transverse to a longitudinal axis for the actuating element of the pressure control device. The actuating element is adjustable transverse to the pivot axis of the lever relative to the latter and is arrestable so that in a simple manner by changing the effective lever length, a change in the transmission between the magnitude of the cam elevations and depressions and the magnitude of the stroke of the respective actuating element and thereby the magnitude of the changes in the pressing-on pressure of the machining elements will be possible.

A design which is very simple to handle will be obtained when the actuating element of the pressure control device, in particular the entire pressure control valve, is pivotable about an axis which is approximately parallel to the pivot axis of the lever, preferably about an axis which intersects the axis of the actuating element at a right angle. In this instance, it is advantageous when the engaging surface of the lever for the actuating element is curved about the pivot axis of the latter. Preferably, the axis of curvature of the engaging surface is with one position of the lever, especially in the central position, located in the pivot axis of the actuating element so that a very precise adjustment of the transmission drive will be possible.

For purposes of obtaining a construction which can easily be checked at any time, the engaging surface for the lever for the actuating element of the pressure control device is provided on that side of the lever which faces away from the control element. Furthermore, every two pivot levers may be arranged adjacent to each other while preferably they freely project in opposite directions.

The pressure control device or devices may be safely arranged on a plate or the like preferably on that side which faces toward the tool. The plate forming a support is nondisplaceably arranged in axial direction opposite to the tool and carries out the axial strokes of the tool so that the relative position of the control devices with regard to the axis of the tool is always the same so that the device can be designed in a very compact manner. The plate or the like may for instance be supported safely on that side of the collar of the driving rod which faces away from the tool while on the other side the control element is provided.

For further simplification of the construction of the device, the hub of the plate which preferably protrudes exclusively beyond the plate side facing away from the tool is designed for conveying pressure fluid to the bores which are provided in the driving rod or the like and to which are connected the cylinders in the tool body.

According to a further feature of the invention, the pressure control device is provided with a manual control which preferably on that side of the pressure control device which faces away from the actuating element is equipped with a turning knob which latter is connected with a pressure setting threaded spindle. In this way, a second pressure setting possibility is obtained which will make it possible independently of the respective prevailing pressure setting by the control element to set the pressure level by hand.

With a preferred embodiment of the invention, four machining elements are provided the pressing-on pressure of which can be controlled by four pressure control valves independently of each other. The pressure control valves are expediently continuously connected to the respective source of pressure fluid.

Figure 2:
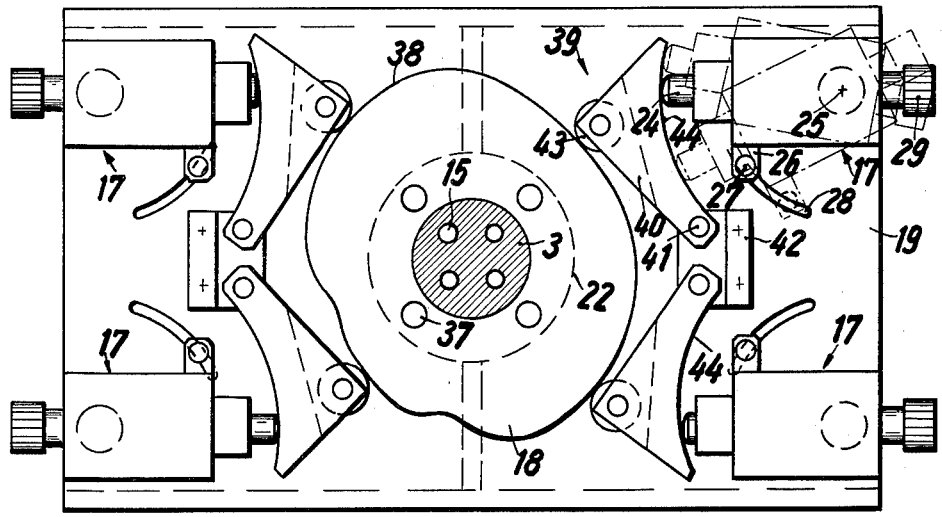
FIG. 2 represents a section taken along the line II — II of FIG. 1.
Figure 3:
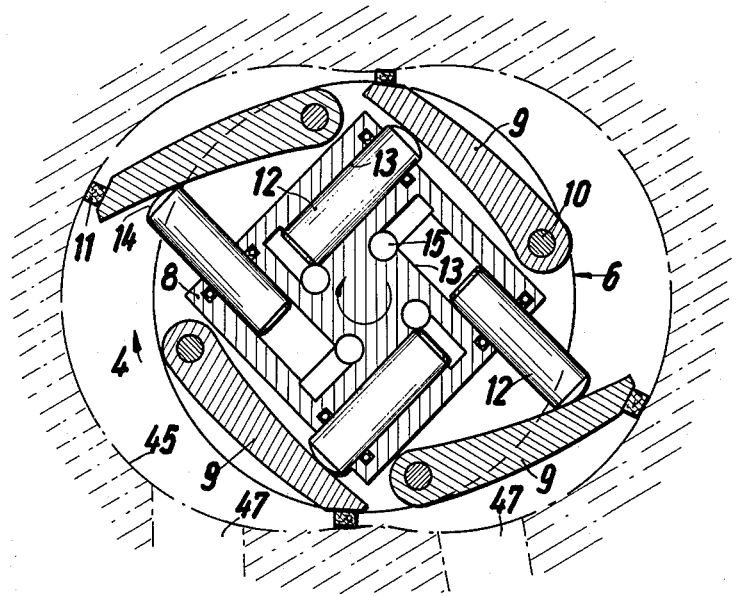
FIG. 3 is a section taken along the line III — III of FIG. 1.

Referring now to the drawings in detail, it will be seen from FIGS. 1 to 3 that a device according to the present invention comprises a honing tool 1 which is rotatable about a vertical axis 2. The honing tool 1 is adapted to be connected directly or indirectly through the intervention of a driving rod 3 located along the axis of tool 1 with the working spindle of a honing machine. The honing tool 1 is non-rotatably connected to the lower end of the driving rod 3 or the like. The working spindle is driven in such a way that the tool carries out a rotary movement in the direction of the arrow 4 and one or more axial stroke movements in the direction of the arrow 5.

As will be seen from FIGS. 1 and 3, the tool has a tool body 6 which between two circular disc-shaped flanges 7 (FIG. 1), said flanges being spaced form each other, is connected to a section 8 which has a square-shaped cross section and is set back relative to the flanges 7. Adjacent to the outer surfaces of this square-shaped section 8 are four lever-shaped supports 9 with bolts 10, which supports are located between the flanges 7. The bolts 10 engage bores of the flange 7. The said supports 9 are each respectively arranged on the outside of the square-shaped section 8 of the tool body 6 and protrudes from its pivot shaft formed by bolt 10 in a direction opposite to the rotary working direction indicated by arrow 4 in the manner of a one-arm lever in such a way that it is dragged by the tool body 6. Each support 9 is adapted to be pivoted out of its starting position which is approximately parallel to the pertaining edge of the square-shaped section 8 about its pivot shaft 10 which is parallel to the axis of the tool, relative to the axis of the tool in radially outward direction. In its starting position, each support 9 extends approximately over the length of the pertaining edge of the square-shaped section 8 of the tool body 6. The supports 9 are distributed uniformly about the tool axis 2. In the direction of the axis of the tool, the supports 9 are fixed between the end flanges 7. At the free end of each support 9, a strip-shaped honing stone 11 is fixed which extends parallel to the axis of the tool.

Within the region of each support 9, in the square-shaped section 8 of the tool body 6, there are displaceably arranged pistons 12 for respective movement in a pertaining cylinder bore 13. The axis of the respective piston 12 is located at a right angle with regard to the outer edge of that square-shaped section 8 which is associated with the pertaining support 9. Furthermore, the respective piston 12 is so arranged that in spaced relationship to the pivot shaft 10 of the pertaining support 9 in the vicinity of its free end it engages the respective pertaining support 9 by means of a spherical segment-shaped rounded end face 14. The four piston pairs 12 are thus in a condition in which they are, so to speak, nested in each other parallel to the outer edges of the square-shaped section 8 of the tool body 6 respectively directly adjacent to an outer edge of the square-shaped section 8, which outer edge is parallel to said piston pairs. The pistons 12 are formed by simple cylindrical bolts.

The inner in diameter, slightly increased ends of the cylinder bores 13 which are provided in the square-shaped section 8 of the tool body 6, are respectively connected to a separate bore 15 which is parallel to the tool axis 2. The bores 15 approximately tangentially lead into the pertaining cylinder bore 13 the axis of which is located in a plane which is at a right angle to the tool axis. The four bores 15 are uniformly distributed about the tool axis 2 and extend upwardly in the driving rod 3.

In spaced relationship to and above the tool 1 within the region of the driving rod 3 there is provided a control device 16 which surrounds said driving rod 3. The control device 16 is equipped with four pressure control devices 17 which engage a common control member 18 (FIG. 2). The control device 16 is equipped with a support in the form of a plate 19 the top side of which has a hub 20. Hub 20 is by means of bearings 21 rotatably journalled on the driving rod or bar 3.

Plate 19 rests by means of its bottom side on the top side of a collar 22 of the driving rod 3 and between said collar 22 and a ring 23 provided on the top side of hub 20 is axially non-displaceably secured relative to the driving rod 3. Plate 19 is prevented from rotation by non-illustrated means in such a way that the plate 19 will not turn together with the driving rod 3 but will remain stationary with regard to the rotary movement of bar 3 while carrying out the axial movements of the driving rod 3 together therewith.

Adjacent to each narrow side of the longitudinal-rectangular plate 19 are adjacent to each other two pressure control devices 17 formed by pressure control valves which are located at the bottom side of plate 19. Each pressure control valve 17 has that side thereof which faces toward the driving rod 3 provided with an actuating element formed by a displaceable valve push rod 24. The central axes of the valve push rods 24 of all pressure control valves 17 are located in a common plane which is at a right angle to the axis of the driving rod 3. Each pressure control valve 17 has its top side provided with a bearing collar bolt 25 which is arranged in spaced relationship to the free end face of the pertaining valve push rod 24. The central axis of each bearing bolt 25 which is parallel to the tool axis intersects the central axis of the pertaining valve push rod 24 at a right angle and by means of which the housing of the respective pressure control valve 17 is pivotally journalled in a bore of plate 19. That lateral surface of each pressure control valve 17 which faces the adjacent pressure control valve 17 is provided with an ear 26 with a clamping screw 27. The clamping screw 27 is guided in a slot 28 of plate 19 which slots is curved around the bolt 25. By means of said clamping screw 27, the pressure tool valve 17 may be arrested in the respective desired pivoting movement. FIG. 2 indicates in dot-dash lines the two end positions for a pressure control valve 17.

On that side of each pressure control valve 17 which faces away from the pertaining valve push rod 24, each pressure control valve 17 comprises a turning knob 29 which is coaxial with the axis of the pertaining valve push rod 24 and which is accessible from the pertaining narrow side of the plate 19. Knob 29 makes it possible by means of a non-illustrated threaded spindle to adjust the valve. The three connecting nipples arranged on the top side of each pressure control valve 17 extend through a corresponding opening in plate 19 and are connected to three hoses 30–32. Of each of the hoses 30–32, one hose 30 is through a radial bore 33 provided in hub 20, connected to an annular groove 34 in hub 20. The annular grooves 34 associated with the four pressure control valves 17 are arranged in spaced relationship to each other and above each other. Each annular groove 34 is connected with a single one of the bores 15 in the driving rod 3 through a radial bore 35 so that each cylindrical bore 13 in the tool body 6 can through a single pressure control valve 17 be pressure actuated independently of the other cylinder bores. A further hose 31 of each pressure control valve 17 is connected to the pressure side of a pressure fluid pump 36, whereas the third hose 32 of each pressure control valve 17 is connected to a compensating vessel to which also the suction side of the pertaining pump 36 is connected. Each pressure control valve 17 has associated its own pressure fluid pump 36. The pressure fluid pumps 36 may be arranged stationarily and connected with the machine in such a way that they will not carry out the axial movements of the driving rod 3 in which instance the hoses 31, 32 are correspondingly long and flexible.

The control member is formed by a cam disc 18 which in a plane which is rectangular to the tool axis 2 is at the bottom side of the collar 22 of rod 3 exchangeably connected to the screws 37, the circumferential edge 38 of the cam disc 18 forming the cam path.

The control of the respective pressure control valve 17 by means of the control element 18 is effected by a transmission drive 39. Each transmission drive 39 comprises a pivotable lever 40 which is pivotable about an axis parallel to the tool axis 2 and by means of a bolt 21 is pivotally mounted on the bottom side of plate 19. The two levers 40, which are respectively associated with two adjacent pressure control valves 17, are by means of those ends which face each other journalled on a common bearing block 42 which is connected to the bottom side of plate 19 and freely protrude from their pivot axes in opposite directions. Within the region of the free end of the levers 40, each lever 40 is equipped with a fork formed by a slot which fork carries a roller 43 which is rotatable about an axis that is parallel to the axis of rotation of the control element 18, said roller 43 being rotatably mounted on the pivot lever 40 and engaging the circumferential edge 38 of the control element 18. That edge 44 of each lever 40 which faces away from the control element 18 is formed by an engaging surface for the spherical segment-shaped free end face of the valve push rod 24 of the pertaining pressure control valve 17 and is concavely curved in such a way that its axis of curvature in the central position of the lever 40 coincides with the pivot axis 25 of the pertaining pressure control valve 17. By pivoting the respective pressure control valve 17 about its pivot axis 25, the effective lever length by means of which the pertaining lever 40 transmits the changes of the cam path 38 onto the valve push rod 24 changes and thereby influences the transmission ratio between the cam shape and the pressure change resulting therefrom and caused by the pressure control valve 17 so that correspondingly different pressures will become effective in the pertaining cylinder bore 13.

The levers 40 and their rollers 43 are distributed about the axis of the cam disc 18 which distribution corresponds to the distribution of the honing stones 11 around the tool axis 2.

The device illustrated in FIGS. 1–3 is provided in particular for honing the inner epitrochoidal surface 45 of the combustion chamber part 46 of a circular piston machine, which combustion chamber part is illustrated in FIGS. 1 and 3 in dot-dash lines. The machining surface 45 is passed through by inlet and outlet passages 47. The cam 38 of the cam disc 18 is so designed that the pressing-on pressure of the honing stones 11 against the machining surface 45 within the region of the least radial spacing of the machining surface 45 from the central machining axis is reduced relative to the range of the greater radial distance while by correspondingly recessed zones on the cam 38 the pressing-on pressure of the honing stones 11 is further reduced within the region of the inlet and outlet slots 47. As a result thereof, over the entire circumference of the machining surface 45, and in spite of different engaging positions and different engaging surfaces of the honing stones 11, a uniform removal of the material will be obtained. The shape of the cam 38 can be ascertained by calculation or experiments, and for each rotationally angular position of the honing tool 1 determines the pressing-on pressure for each individual honing stone 11 inasmuch as it opens the pertaining pressure valves to a greater or less extent.

According to a further feature of the invention, it is provided near the end of the machining operation to reduce the pressure at which the honing stones 11 are pressed against the machining surface 45, independently of the changes in the pressing-on pressure effected by the control element 18. This reduction of the pressing-on pressure of the honing stones 11 may be effected by reducing the pressure at the pressure fluid source 36, preferably in all pressure fluid sources 36, or a decrease in the pressure level is effected directly in the pressure control device 17 preferably in all pressure control devices 17. In this way, a so-called post-honing effect will be obtained which brings about a further smoothing and refinement of the machining surface 45.

Furthermore, there exists the possibility in one operation to pre-hone or finish-hone by means of two superimposed honing tools 1 which are arranged on a common driving rod or the like and which are made effective successively in operative connection with a control device 16 and are brought into engagement with the machining surface 45. In this connection, one honing tool 1 is equipped for pre-honing with honing stones 11 of a coarse grain, whereas the other honing tool 1 is equipped for the finish-honing with honing stones 11 of a fine grain.

It is, of course, to be understood that the present invention is, by no means, limited to the particular showing in the drawings but also comprises any modifications within the scope of the appended claims.

What we claim is:

1. An apparatus for machining an internal peripheral surface of varying radius comprising in combination a rotatable tool body, at least one machining element mounted on said tool body for movement radially outwardly, a pressure fluid device on said tool body engaging said machining element for moving said element outwardly into contact with said internal surface, a source of pressure fluid means connected to said pressure fluid device to press said machining element outwardly, a pressure regulating device controlling the pressure to said pressure fluid device, both said source of pressure fluid means and said pressure regulating device being connected positively to said pressure fluid device, a transmission drive operating said pressure regulating device to control the pressure exerted on the machining element, and a program device engaging said transmission drive to compensate and adjust said pressure regulating device according to rotational angle position, said transmission drive and program device being mounted for relative rotary movement in synchronism with the rotation of said tool body.

2. An apparatus for machining an internal peripheral surface of varying radius comprising a rotatable tool body, at least one machining element mounted on said tool body for movement radially outwardly, a pressure fluid device on said tool body engaging said machining element for moving said element outwardly into contact with said internal surface, pressure fluid means connected to said pressure fluid device to press said machining element outwardly, a pressure regulating device controlling the pressure to said pressure fluid device, a transmission drive operating said pressure regulating device to control the pressure exerted on the machining element, and a program device engaging said transmission drive to adjust said pressure regulating device, said transmission drive and program device being mounted for relative rotary movement in synchronism with the rotation of said tool body, said transmission drive including a pivotally mounted lever engageable by said program device to operate said pressure regulating device, and said pressure regulating device being ajustably mounted to vary the lever arm of said lever in engagement with said pressure regulating device.

3. An apparatus as claimed in claim 2, in which said machining element includes an abrasive stone engageable with said internal surface.

4. An apparatus for machining an internal peripheral surface of varying radius comprising a rotatable tool body, at least one machining element mounted on said tool body for movement radially outwardly, a pressure fluid device on said tool body engaging said machining element for moving said element/outwardly into contact with said internal surface, pressure fluid means connected to said pressure fluid device to press said machining element outwardly, a pressure regulating device controlling the pressure to said pressure fluid device, a transmission drive operating said pressure regulating device to control the pressure exerted on the machining element, and a program device engaging said transmission drive to adjust said pressure regulating device, said transmission drive and program device being mounted for relative rotary movement in synchronism with the rotation of said tool body, a plurality of machine elements being mounted on said tool body with said elements in pairs on opposite sides of said tool body to exert opposed pressures on opposite sides of said internal surface, a plurality of said fluid devices being mounted on said tool body each engaging one of said machining elements, a plurality of pressure regulating devices control the pressure to said pressure fluid devices individually, and a plurality of transmission drives, each of which operates one of said pressure regulating devices and engages said program device, and said plurality of transmission drives and said program device being mounted for relative rotary movement in synchronism with the rotation of said tool body.

5. An apparatus for machining an internal peripheral surface of varying radius comprising a rotatable vertical shaft, a tool body fixed to the lower end of said shaft, a plurality of machining elements movably mounted on said tool body for outward, radial movement, a plurality of pressure fluid devices each engaging one of said machining elements for moving said element outwardly into contact with said internal surface, pressure fluid means connected to each of said pressure fluid devices to press each of said machining elements outwardly, pressure regulating devices mounted on a stationary support each controlling the pressure to one of said pressure regulating devices, transmission drives each operating one of said pressure regulating devices to control the pressure exerted on the corresponding machining element, and a program device fixed on said vertical shaft for rotation therewith engaging said transmission drives to adjust said pressure regulating devices.

6. An apparatus as claimed in claim 5, in which each of said pressure fluid devices includes a piston and cylinder, the program device is a cam disk fixed to said vertical shaft, and each of said transmission drives includes a lever engaged by said cam disk and actuating a piston and cylinder to operate a corresponding pressure regulating device.

7. An apparatus as claimed in claim 6, in which each said piston and cylinder is pivoted on said stationary support to change the engagement with said lever and thereby vary the length of the lever arm and the pressure exerted on said machining element.

* * * * *